United States Patent
Sakamoto et al.

(10) Patent No.: US 8,652,987 B2
(45) Date of Patent: Feb. 18, 2014

(54) METHOD FOR PRODUCING ALLOY CATALYST FOR REDOX REACTION

(75) Inventors: Ryogo Sakamoto, Saitama (JP); Kaoru Omichi, Saitama (JP); Masao Ichiwaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 244 days.

(21) Appl. No.: 13/313,081

(22) Filed: Dec. 7, 2011

(65) Prior Publication Data
US 2012/0149555 A1 Jun. 14, 2012

(30) Foreign Application Priority Data
Dec. 8, 2010 (JP) .................................. 2010-273920

(51) Int. Cl.
*B01J 23/40* (2006.01)
*B01J 23/74* (2006.01)
*C22C 19/03* (2006.01)
*C22C 5/04* (2006.01)

(52) U.S. Cl.
USPC ............ 502/185; 420/441; 420/456; 420/468

(58) Field of Classification Search
USPC ............................ 502/185; 420/441, 456, 468
See application file for complete search history.

(56) References Cited

U.S. PATENT DOCUMENTS

| | | | | | |
|---|---|---|---|---|---|
| 1,832,307 | A | * | 11/1931 | Kingsbury | 420/456 |
| 5,489,563 | A | * | 2/1996 | Brand et al. | 502/185 |
| 2003/0096156 | A1 | * | 5/2003 | Asaoka et al. | 429/44 |
| 2004/0248730 | A1 | * | 12/2004 | Kim et al. | 502/185 |
| 2008/0166623 | A1 | * | 7/2008 | Cendak et al. | 429/44 |
| 2010/0316937 | A1 | * | 12/2010 | Sakamoto et al. | 429/524 |
| 2012/0021331 | A1 | * | 1/2012 | Zhu et al. | 429/483 |
| 2013/0085061 | A1 | * | 4/2013 | Stamenkovic et al. | 502/185 |

FOREIGN PATENT DOCUMENTS

| | | | | | |
|---|---|---|---|---|---|
| JP | 64-045061 | | * | 2/1989 | H01M 4/90 |
| JP | 2011016125 | A | * | 1/2011 | B01J 23/89 |

OTHER PUBLICATIONS

"Pt-Ni alloy nanoparticles supported on CNF as catalyst for direct ethanol fuel cells," D. Soundararajan et al. Current Applied Physics 12 (2012), pp. 854-859.*
"Synthesis of graphene-supported hollow Pt-Ni nanocatalysts for highly active electrocatalysis toward the methanol oxidation reaction," Yaojuan Hu et al. Electrochimica Acta 85 (2012), pp. 314-321.*
"Monodisperse and highly active PtNi nanoparticles for O2 reduction," Hongzhou Yang et al. Electrochemistry Communications 11 (2009), pp. 2278-2281.*
"A highly active PtNi/C electrocatalyst for methanol electro-oxidation in alkaline media," Qian Jiang et al. Catalysis Communications 12 (2010), pp. 67-70.*

* cited by examiner

*Primary Examiner* — Patricia L Hailey
(74) *Attorney, Agent, or Firm* — Capitol City TechLaw, PLLC

(57) ABSTRACT

A method for producing an alloy catalyst for redox reaction comprising alloy particles of platinum and nickel, wherein the alloy particles are equipped at an outer surface with a crystal lattice plane represented by a Miller index {111} and have an average particle diameter in a range of 6 to 20 nm, the method comprising: dissolving, in an alcohol, a salt and/or complex of platinum, a salt and/or complex of nickel, and a polymer containing a plurality of salt structures comprising an organic cation and a halogen anion in a polymer chain and heating the resulting solution to reflux under an inert atmosphere.

43 Claims, 8 Drawing Sheets

METHOD FOR PRODUCING ALLOY CATALYST FOR REDOX REACTION

This application claims the foreign priority benefit under 35 U.S.C. §119 of Japanese Patent Application No. 2010-273920 filed on Dec. 8, 2010, the disclosure of which is incorporated herein by reference.

BACKGROUND OF THE INVENTION

1. Field of the Invention

The present invention relates to a method for producing an alloy catalyst for redox reaction used as, for example, an electrode catalyst for a hydrogen-oxygen fuel cell.

2. Description of the Related Art

Conventionally, there is known a hydrogen-oxygen fuel cell equipped with an electrolyte layer sandwiched by a pair of electrode catalyst layers. In the hydrogen-oxygen fuel cell, when e.g. a hydrogen gas is introduced as a reducing gas to an anode electrode, the hydrogen gas generates protons by the action of the catalyst in the electrode catalyst layer, as is shown in formula (1). The generated protons move to the electrode catalyst layer on a cathode electrode side via the electrolyte layer.

On the other hand, when the hydrogen gas is introduced to the anode electrode and e.g. an oxygen gas is introduced as an oxidation gas to the cathode electrode, the protons generate water by reacting with the oxygen gas by the action of the catalyst in the electrode catalyst layer on the cathode electrode side, as is shown in formula (2). Thus, by connecting the cathode electrode and the anode electrode with a conducting wire, an electric current can be taken out. At this time, each electrode catalyst layer acts as a catalyst for redox reaction for generating the reactions of the formulae (1) and (2).

$$\text{Anode electrode: } 2H_2 \rightarrow 4H^+ + 4e^- \quad (1)$$

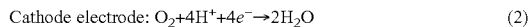
$$\text{Cathode electrode: } O_2 + 4H^+ + 4e^- \rightarrow 2H_2O \quad (2)$$

As this type of catalyst for redox reaction, a platinum catalyst is known, but the platinum catalyst is expensive and thus a decrease of an amount of the platinum used is desired. Thus, as a catalyst for redox reaction decreasing the amount of the platinum used, a platinum-nickel alloy catalyst is suggested (for examples, refer to Japanese Patent Laid-Open No. 64-45061). According to an X-ray diffraction, it is said that this platinum-nickel alloy catalyst contains approximately 50 atomic % of nickel in the alloy and has a particle diameter of 4.8 nm. Further, it is said that this platinum-nickel alloy catalyst has 1.4 times higher catalytic activity than a platinum catalyst having a same mass.

However, for an alloy catalyst for redox reaction, it is desired that the catalyst has a better catalytic activity.

Thus, in view of such circumstances, an object of the present invention is to provide a method for producing an alloy catalyst for redox reaction which is capable of obtaining a better catalytic activity than that of the conventional platinum-nickel alloy catalyst. Another object of the present invention is to provide a method for producing a carbon powder supporting an alloy catalyst for redox reaction in which the alloy catalyst for redox reaction is supported on the carbon powder.

SUMMARY OF THE INVENTION

The present inventors have made various studies on catalytic activity of an alloy catalyst for redox reaction comprising alloy particles of platinum and nickel. As a result, the present inventors have found that the alloy catalyst for redox reaction comprising alloy particles of platinum and nickel shows a superior catalytic activity, when the alloy particle is equipped at an outer surface with a crystal lattice plane represented by a specific Miller index and also has a specific average particle diameter. Additionally, as a result of further studies, the present inventors have found an advantageous method for producing the alloy catalyst for redox reaction comprising alloy particles of platinum and nickel, and reached to the present invention.

Thus, in order to achieve the above objects, the present invention provides a method for producing an alloy catalyst for redox reaction comprising alloy particles of platinum and nickel, wherein the alloy particles are equipped at the outer surface with a crystal lattice plane represented by a Miller index {111} and have an average particle diameter in the range of 6 to 20 nm, the method comprising: dissolving, in an alcohol, a salt and/or complex of platinum, a salt and/or complex of nickel, and a polymer containing a plurality of salt structures comprising an organic cation and a halogen anion in a polymer chain and heating the resulting solution to reflux under an inert atmosphere.

The alloy catalyst for redox reaction obtained by the production method of the present invention has an average particle diameter in the above-mentioned range, and thus it is possible to be equipped at the outer surface with the crystal lattice plane represented by the Miller index {111} in a ratio sufficient for obtaining a superior catalytic activity. The crystal lattice plane represented by the Miller index {111} means plane groups equivalent to the crystal lattice plane represented by the Miller index (111), and can include the crystal lattice plane represented by the Miller indices (−111), (1-11), (11-1), and the like.

The crystal lattice plane represented by the Miller index {111} has a larger number of atoms per unit area than other crystal lattice planes, and atoms exist densely, and thus it is possible to suppress entry of oxygen species from surfaces of the particle to insides thereof. The oxygen species are chemical species which cause an elution of platinum, and can include an oxygen atom, a hydroxy-ion and the like.

Further, the alloy particle has an average particle diameter in the above-mentioned range and thus has a smaller catalytic active surface area per unit mass than alloy particles having an average particle diameter of less than 6 nm. As a result, the alloy catalyst for redox reaction obtained by the production method of the present invention is unlikely to cause Ostwald growth of the particle caused by an elution and a reprecipitation of platinum from the surface of the alloy particle, and thus it is superior in stability to a repetition of an electrochemical oxidation reaction, and is capable of suppressing a decrease in a catalytic activity.

When the average particle diameter of the alloy catalyst for redox reaction is less than 6 nm, it is not possible to be equipped at the outer surface with the crystal lattice plane represented by the Miller index {111} in a ratio sufficient for obtaining a superior catalytic activity. Further, when the average particle diameter of the alloy particle is less than 6 nm, a particle growth of the alloy particle becomes larger with the repetition of the electrochemical oxidation reaction, and thus the catalytic activity decreases significantly. On the other hand, the alloy catalyst for redox reaction cannot have a further increased effect when the average particle diameter of the alloy particle exceeds 20 nm.

The alloy catalyst for redox reaction can be produced by dissolving, in an alcohol, a salt and/or complex of platinum, a salt and/or complex of nickel, and a polymer containing a plurality of salt structures comprising an organic cation and a halogen anion in a polymer chain and heating the resulting solution to reflux under an inert atmosphere.

By conducting as above, a platinum cation derived from the salt and/or complex of platinum and a nickel cation derived from the salt and/or complex of nickel are moderately reduced in the alcohol to first form a cluster of platinum and nickel. Next, alloy particles of platinum and nickel are formed from the cluster. In the formation process of the alloy particles of platinum and nickel, the alloy particle of platinum and nickel has a shape of tetradecahedron and is equipped at the outer surface with two kinds of crystal lattice planes which are the crystal lattice plane represented by the Miller index {111} and the crystal lattice plane represented by the Miller index {100}.

In this time, the polymer having the constitutions is present in a periphery of the cluster, the polymer is adsorbed onto the crystal lattice plane represented by the Miller index {111} of the two kinds of crystal lattice planes. The polymer has an organic cation in a part of a polymer chain and contains a plurality of salt structures comprising the organic cation and a halogen anion. Thus, when the polymer is adsorbed onto the crystal lattice plane represented by the Miller index {111}, the halogen anion is strongly adsorbed onto the crystal lattice plane represented by the Miller index {111} while an electrostatic interaction between the organic cation and the halogen anion is generated. As a result, the polymer becomes equipped with an electric double layer-like constitution relative to the crystal lattice plane represented by the Miller index {111} and can be strongly adsorbed onto the crystal lattice plane.

Because the polymer is strongly adsorbed onto the crystal lattice plane represented by the Miller index {111} at an outer surface of the alloy particles of platinum and nickel, the crystal lattice plane represented by the Miller index {100} is sandwiched between the crystal lattice planes represented by the Miller index {111} and grows up with decreasing an external surface area from a center to an external direction. On the other hand, the crystal lattice plane represented by the Miller index {111} grows up at a side surface of the crystal lattice plane represented by the Miller index {100} along a growth direction of the crystal lattice plane represented by the Miller index {100}. As a result, the alloy particles of platinum and nickel can be equipped at the outer surface with the crystal lattice plane represented by the Miller index {111}.

The alloy particles of platinum and nickel obtained as above have any shape selected from the group consisting of a regular octahedron, a truncated regular octahedron, a regular tetrahedron, and a truncated regular tetrahedron. The truncated regular octahedron is a shape in which each apex of the regular octahedron is cut off, and the truncated regular tetrahedron is a shape in which each apex of the regular tetrahedron is cut off.

Further, a rapid growth of the alloy particles of platinum and nickel is suppressed because the platinum cation and the nickel cation are moderately reduced in the alcohol and the polymer is strongly adsorbed onto the crystal lattice plane represented by the Miller index {111}. Thus, according to the production method of the present invention, the alloy catalyst for redox reaction comprising the alloy particles of platinum and nickel having an average particle diameter in the range of 6 to 20 nm can be obtained.

The salt and/or complex of platinum can include, for example, platinum acetylacetonate, platinum acetate, and a platinum ethylenediamine complex and the like, but platinum acetylacetonate is preferably used.

The salt and/or complex of nickel can include, for example, nickel acetate tetrahydrate, nickel nitrate, and a nickel acetylacetonate complex and the like, but nickel acetate tetrahydrate is preferably used.

The polymer containing a plurality of salt structures comprising an organic cation and a halogen anion in a polymer chain used is preferably, for example, polydiallyldimethylammonium chloride.

The method for producing an alloy catalyst for redox reaction of the present invention requires that the polymer contains salt structures comprising an organic cation and a halogen anion in a polymer chain. The polymer containing salt structures in a polymer chain can include sodium polyacrylate, sodium polystyrene sulfonate, and the like, but desired alloy particles of platinum and nickel cannot be obtained even if these polymers are used in the method for producing an alloy catalyst for redox reaction of the present invention. It is thought that reasons therefor are because a salt structure in sodium polyacrylate, sodium polystyrene sulfonate, and the like is not a salt structure comprising a halogen anion and an organic cation, and an adsorption of the halogen anion onto the crystal lattice plane represented by the Miller index {111} is not generated.

The alcohol for dissolving the salt and/or complex of platinum, the salt and/or complex of nickel, and the polymer can include, for example, ethylene glycol, glycerine, propylene glycol, and the like, but ethylene glycol is preferably used.

The salt and/or complex of platinum and the salt and/or complex of nickel are preferably used in a molar ratio in the range of 1:1 to 1:3. Additionally, when the polydiallyldimethylammonium chloride is used as the polymer, it is preferably used in the mass range of, for example, 100 to 500 mg relative to one mole of the salt and/or complex of platinum.

A concentration of the salt and/or complex of platinum relative to the alcohol is preferably, for example, from 0.5 to 30 mmol/liter, and a concentration of the salt and/or complex of nickel is preferably, for example, from 0.5 to 90 mmol/liter.

The heating to reflux is preferably conducted, for example, under an argon atmosphere as an inert atmosphere, at a temperature in the range of 130 to 190° C., and for a period of time in the range of 1 to 3 hours.

According to the production method of the present invention, the alloy catalyst for redox reaction comprising the alloy particles of platinum and nickel can be suitably produced by, for example, dissolving platinum acetylacetonate, nickel acetate tetrahydrate, and polydiallyldimethylammonium chloride in ethylene glycol and heating the resulting solution to reflux under an inert atmosphere.

Next, a first aspect of the method for producing a carbon powder supporting an alloy catalyst for redox reaction according to the present invention comprises the steps of attaching the alloy particles of platinum and nickel obtained by the above method onto the carbon powder and heat treating the carbon powder having the alloy particles of platinum and nickel attached under a nonoxidative atmosphere.

The step of attaching the alloy particles of platinum and nickel onto the carbon powder can be conducted by separating the alloy particles of platinum and nickel from the refluxed solution, and then dispersing the alloy particles of platinum and nickel and the carbon powder into a solvent and stirring them.

The carbon powder can include, for examples, a carbon black powder and/or carbon nanotube, and the like, and the carbon powder can be used in a mass ratio in the range of, for example, 1:9 to 1:1 relative to the alloy particles of platinum and nickel. Additionally, the solvent can include methanol, ethanol, and the like, and can be used so that a concentration of the alloy particles of platinum and nickel is in the range of 0.3 to 12 g/liter.

Next, the carbon powder supporting an alloy catalyst for redox reaction can be obtained by separating the carbon powder having the alloy particles of platinum and nickel attached from the solvent and then heat treating the carbon powder having the alloy particles of platinum and nickel attached under a nonoxidative atmosphere.

The heat treating is preferably conducted, for example, under a mixed atmosphere of hydrogen and argon as the nonoxidative atmosphere, at a temperature in the range of 200 to 400° C., and for a period of time in the range of 1 to 3 hours. The mixed atmosphere of hydrogen and argon used can include, for example, an atmosphere containing 4 to 10% by volume of hydrogen in argon.

Next, a second aspect of the method for producing a carbon powder supporting an alloy catalyst for redox reaction according to the present invention comprises the steps of: dispersing a carbon powder into a solution, which is obtained by dissolving, in an alcohol, a salt and/or complex of platinum, a salt and/or complex of nickel, and a polymer containing a plurality of salt structures comprising an organic cation and a halogen anion in a polymer chain, and heating the resulting dispersed solution to reflux under an inert atmosphere; and heat treating a reaction product of the heating to reflux under a nonoxidative atmosphere.

The salt and/or complex of platinum, the salt and/or complex of nickel, the polymer containing a plurality of salt structures comprising an organic cation and a halogen anion in a polymer chain, and the alcohol for dissolving them used can include exactly the same materials in exactly the same amount ranges as in the above-mentioned method for producing the alloy catalyst for redox reaction of the present invention. The carbon powder used can include exactly the same materials in exactly the same amount ranges as those used in the first aspect of the method for producing a carbon powder supporting an alloy catalyst for redox reaction according to the present invention.

The heating to reflux can be conducted in exactly the same manner as in the above-mentioned method for producing an alloy catalyst for redox reaction of the present invention. According to the production method of the present aspect, a carbon powder having the alloy particles of platinum and nickel attached can be obtained as a reaction product of the heating to reflux.

According to the production method of the present aspect, the carbon powder supporting an alloy catalyst for redox reaction can be obtained by separating the carbon powder having the alloy particles of platinum and nickel attached as a reaction product of the heating to reflux from the refluxed solution and then heat treating the carbon powder having the alloy particles of platinum and nickel attached under a nonoxidative atmosphere. The heat treating can be conducted in exactly the same manner as in the first aspect of the method for producing a carbon powder supporting an alloy catalyst for redox reaction according to the present invention.

BRIEF DESCRIPTION OF THE DRAWINGS

FIG. 6(a) is a high resolution TEM image of the alloy particle A of platinum and nickel, FIG. 6(b) is a high resolution TEM image of the alloy particle B of platinum and nickel, and FIG. 6(c) is a high resolution TEM image of the alloy particle C of platinum and nickel;

FIG. 7(a) is a pseudo electron diffraction pattern of the alloy particle A of platinum and nickel, FIG. 7(b) is a pseudo electron diffraction pattern of the alloy particle B of platinum and nickel, and FIG. 7(c) is a pseudo electron diffraction pattern of the alloy particle C of platinum and nickel;

FIG. 8(a) is a view shown from a predetermined angle $\alpha$, and FIG. 8(b) is a view shown from a predetermined angle $\beta$; FIG. 9(a) is a perspective view, and FIG. 9(b) is a view shown from a predetermined angle $\gamma$.

DETAILED DESCRIPTION OF THE PREFERRED EMBODIMENTS

Next, an embodiment of the present invention will be described in further detail with reference to the accompanying drawings.

The alloy catalyst for redox reaction obtained by the production method of the present embodiment comprises alloy particles of platinum and nickel, wherein the alloy particle is equipped at an outer surface with a crystal lattice plane represented by a Miller index {111}, and has an average particle diameter in the range of 6 to 20 nm.

Figure 1:
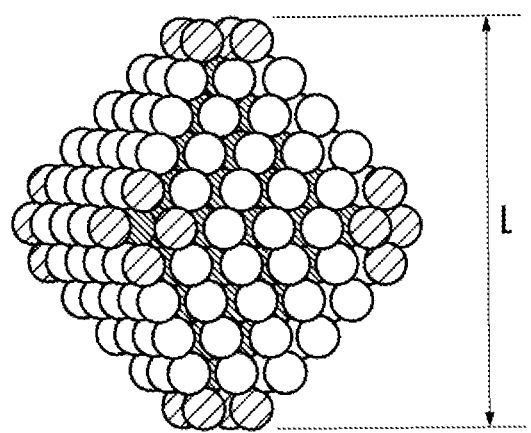
FIG. 1 is a typical diagram indicating alloy particles of platinum and nickel having a truncated regular octahedron shape.

As one example, a typical diagram showing the alloy particles of platinum and nickel having a truncated regular octahedron shape is shown in FIG. 1. In FIG. 1, white balls without hatched lines indicate, of the atoms constituting the truncated regular octahedron, the atoms exposed to the outer surface and forming the crystal lattice plane represented by the Miller index {111}. Further, in FIG. 1, balls with hatched lines extending from upper right to lower left indicate the atoms exposed to the outer surface and forming the crystal lattice plane represented by the Miller index {100}. Still further, balls with hatched lines extending from upper left to lower right in FIG. 1 indicate the atoms not exposed to the outer surface.

Next, the production method of the alloy catalyst for redox reaction comprising the alloy particles of platinum and nickel in the present embodiment will be described.

First, 24 mg of platinum acetylacetonate, 15 mg of nickel acetate tetrahydrate, 26 μL of 35% by mass aqueous solution of polydiallyldimethylammonium chloride (corresponding to 360 mg relative to 1 mol of platinum acetylacetonate), and 50 mL of ethylene glycol are added to a three neck flask and mixed. As a result, a solution of platinum acetylacetonate, nickel acetate tetrahydrate, and polydiallyldimethylammonium chloride dissolved in ethylene glycol is obtained.

Next, the solution is heated to reflux at a temperature of 140° C. for two hours under a flowing argon, and then is cooled to room temperature in air. As a result, a black solution containing an alloy catalyst for redox reaction comprising alloy particles of platinum and nickel can be obtained.

Figure 2:
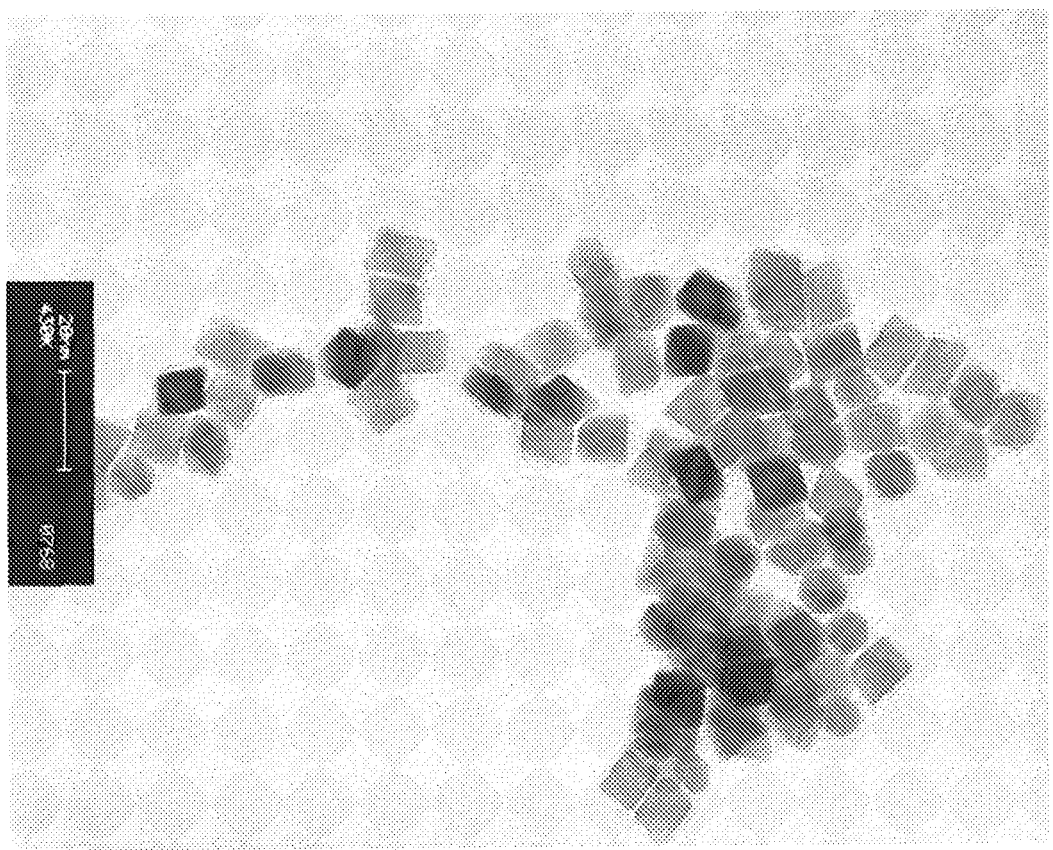
FIG. 2 is a transmission electron microscope image of the alloy particles of platinum and nickel obtained by the production method of the present invention.

Next, tetrahydrofuran as a poor solvent is added to 50 mL of the black solution, sufficiently mixed and subjected to a centrifuge to remove a supernatant liquid, and a transmission electron microscope (TEM) image of the resulting alloy particles of platinum and nickel dispersed into 50 mL of methanol is shown in FIG. 2. As is shown in FIG. 2, it can be confirmed that the alloy particles of platinum and nickel have a particle diameter of about 12 nm, look like a shape of a square, a rhombus or a parallelogram in a planar view, largely have a steric shape of a regular octahedron, a truncated regular octahedron, a regular tetrahedron or a truncated regular tetrahedron, and are equipped at an outer surface with a crystal lattice plane represented by a Miller index {111}.

Next, the first aspect of the production method of the carbon powder supporting an alloy catalyst for redox reaction in the present embodiment will be described.

First, 15 mg of the alloy particles of platinum and nickel equipped at an outer surface with a crystal lattice plane represented by a Miller index {111} obtained by the production method of the alloy catalyst for redox reaction of the present embodiment are dispersed into 50 mL of methanol to obtain a dispersed solution. Next, 144 mg of carbon black powder is added to the dispersed solution and is mixed by stirring at room temperature (20° C.) for twelve hours using a magnetic stirrer. As the carbon black powder, carbon ECP (trade name) manufactured by Lion Corporation, Vulcan XC-72 (trade name) manufactured by Cabot Corporation, and the like can be used.

Next, the dispersed solution containing carbon black powder dispersed is performed with a suction filtration using a filter paper (manufactured by Kiriyama Glass Company, trade name: Kiriyama funnel filter paper No. 6). The filter paper has a pore diameter of 3 μm or less. Next, residues remaining on the filter paper are taken out, and are heat treated at a temperature of 300° C. for two hours under a mixed gas atmosphere, the mixed gas being a mixture of hydrogen and argon at a volume ratio of 4:96. As a result, the carbon powder supporting the alloy catalyst for redox reaction can be obtained.

Figure 3:
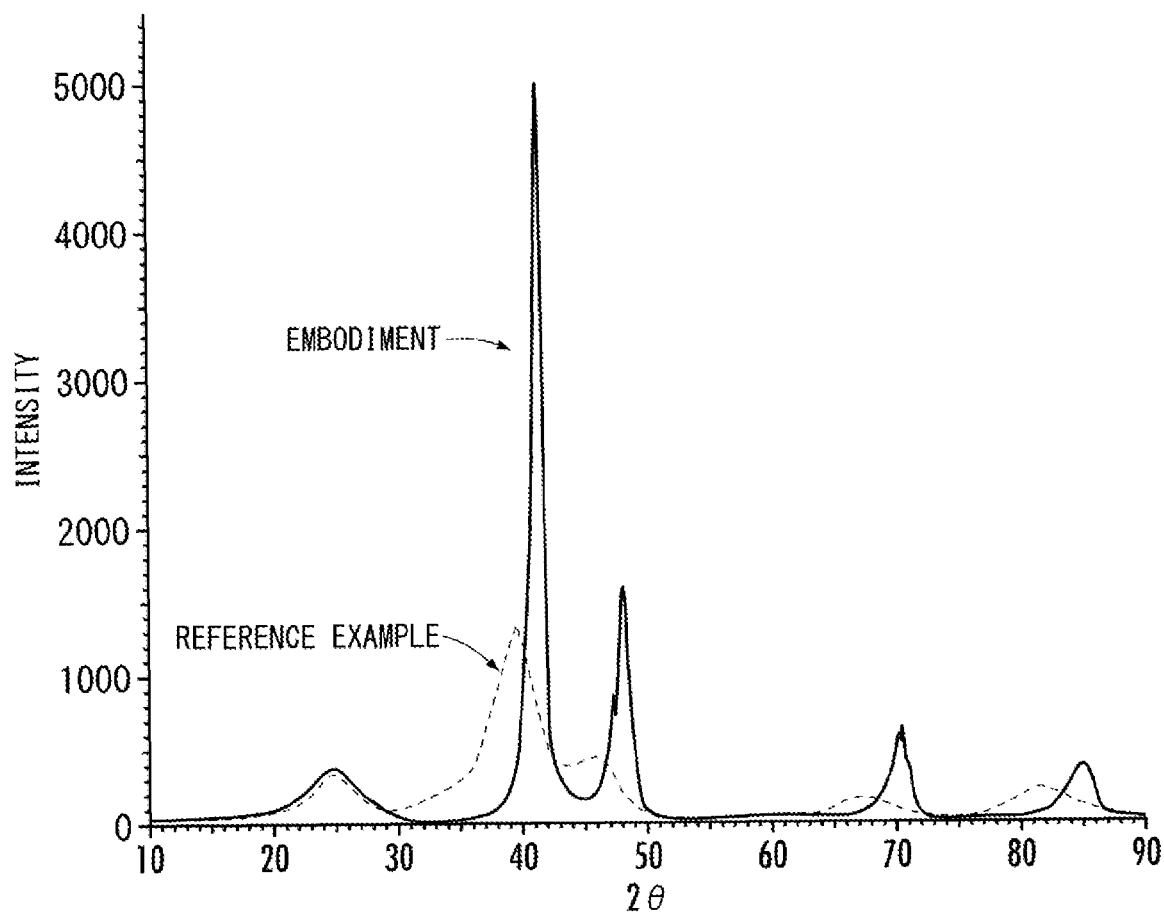
FIG. 3 is a chart showing X-ray diffraction patterns of the alloy particles of platinum and nickel supported on the carbon powder supporting an alloy catalyst for redox reaction obtained by the production method of the present invention and a platinum catalyst of a reference example.

Next, the alloy particles of platinum and nickel supported on the carbon powder supporting the alloy catalyst for redox reaction obtained by the present embodiment were performed with X-ray diffraction using an X-ray diffractometer. Cu was used as the radiation source. FIG. 3 shows the obtained X-ray diffraction pattern.

Next, as a reference example, the X-ray diffraction was performed to a platinum catalyst (manufactured by Tanaka Kikinzoku Kogyo K.K., trade name: TEC10V30E, platinum support quantity of 30% by mass) supported on carbon black powder in exactly the same manner as in the above alloy particles of platinum and nickel. FIG. 3 shows the obtained X-ray diffraction pattern.

As is shown in FIG. 3, the main peak of the platinum catalyst of the reference example lies in the vicinity of $2\theta=40°$, whereas the main peak of the above alloy particles of platinum and nickel lies in the vicinity of $2\theta=41.5°$. Therefore, it is apparent that the alloy particles of platinum and nickel have its main peak shifted to a higher angle side than the platinum catalyst of the reference example, and it is apparent that the platinum and nickel are alloyed in the alloy particles of platinum and nickel.

Next, composition analysis was performed to the alloy particles of platinum and nickel using an energy dispersive X-ray spectrometer. As a result, an atomic ratio of platinum: nickel of the alloy particles of platinum and nickel was 66:34.

Further, the average particle diameter of the alloy particles of platinum and nickel calculated using a Scherrer's equation shown in equation (3) below, from the main peak in FIG. 3, was 8.5 nm.

$$L=K\lambda/(\beta \cos \theta) \qquad (3)$$

where L: average particle diameter, K: constant (0.9), λ: wavelength (1.54 Å), β: full width at half maximum.

Figure 4:
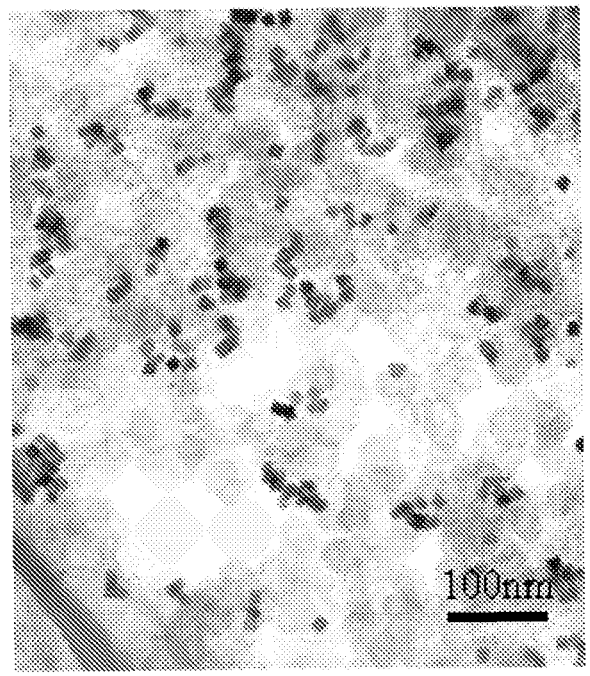
FIG. 4 is a TEM image at 125,000-fold magnifications of the alloy particles of platinum and nickel supported on the carbon powder supporting an alloy catalyst for redox reaction obtained by the production method of the present invention.

Next, the alloy particles of platinum and nickel were observed using a transmission electron microscope (TEM). FIG. 4 shows the obtained TEM image. As is shown in FIG. 4, it is apparent that the alloy particles of platinum and nickel are an aggregate of alloy particles having any of a square, a rhombus, and a triangle shape in a planar view.

The average particle diameter was calculated for the alloy particles of platinum and nickel, by image processing the TEM image, and the result was 16.7 nm. From the calculation result, the average particle diameter of the alloy particles of platinum and nickel can be estimated to be in the range of 8.5 to 16.7 nm.

Figure 5:
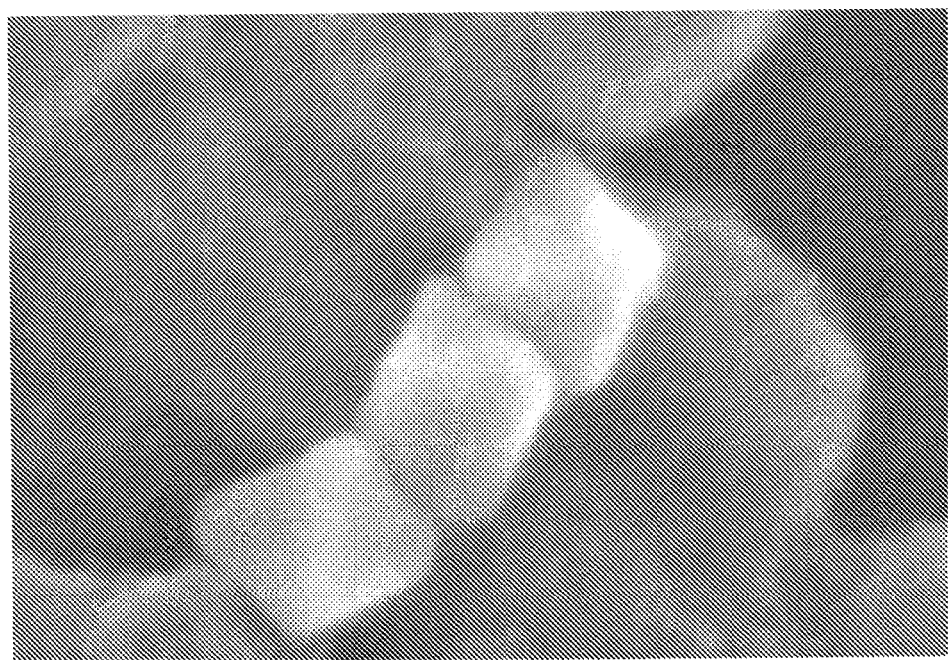
FIG. 5 is a SEM image at 2,000,000-fold magnifications of the alloy particles of platinum and nickel supported on the carbon powder supporting an alloy catalyst for redox reaction obtained by the production method of the present invention.

Next, the alloy particles of platinum and nickel were observed using a scanning electron microscope (SEM). As a result, it turned out that the alloy particles of platinum and nickel were an aggregate of alloy particles having any shape of a regular octahedron, a truncated regular octahedron, a regular tetrahedron, and a truncated regular tetrahedron. FIG. 5 shows an SEM image of the particle having the truncated regular octahedron shape, out of the alloy particles of platinum and nickel.

Figure 6:
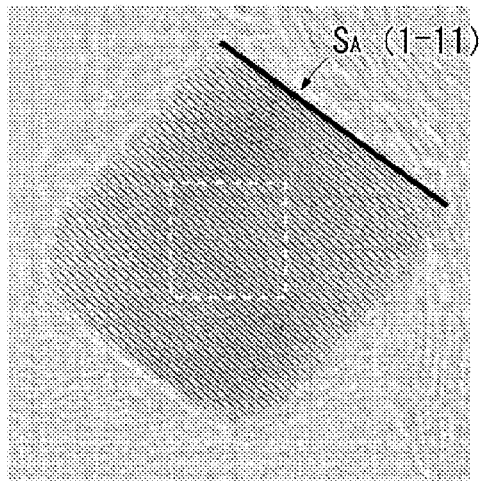
FIG. 6 is high resolution TEM images at 4,000,000-fold magnifications of the alloy particles of platinum and nickel supported on the carbon powder supporting an alloy catalyst for redox reaction obtained by the production method of the present invention.
Figure 6:
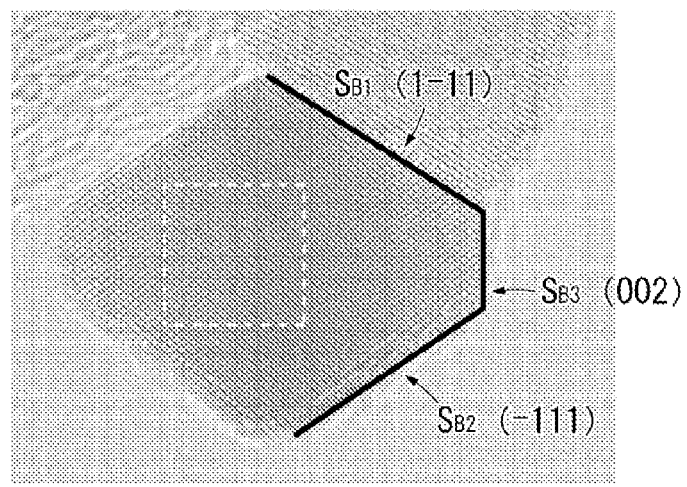
Figure 6:
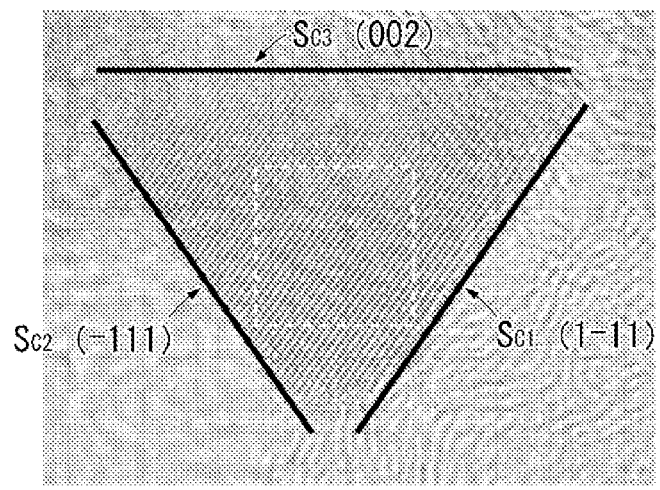

Next, the alloy particles of platinum and nickel were observed using a high resolution transmission electron microscope (manufactured by Hitachi High-Technologies Corporation, trade name: H-9000UHR, high resolution TEM). FIGS. 6(a), 6(b), and 6(c) show the high resolution TEM images of the alloy particle A, B, and C of platinum and nickel.

It is apparent from FIG. 6(a) that the alloy particle A of platinum and nickel is of an octagonal shape which lacks four corners of the rectangle in a planar view. Further, it is apparent from FIG. 6(b) that the alloy particle B of platinum and nickel is of a hexagonal shape which lacks two corners of a rhombus in a planar view. Still further, it is apparent from FIG. 6(c) that the alloy particle C of platinum and nickel is of a hexagonal shape which lacks three corners of a triangle in a planar view.

Next, a pseudo electron diffraction pattern was obtained by processing with fast Fourier Transform algorithm a rectangle region surrounded by a dotted line in each of FIGS. 6(a), 6(b) and 6(c). The results are shown in FIGS. 7(a), 7(b) and 7(c).

Figure 7:
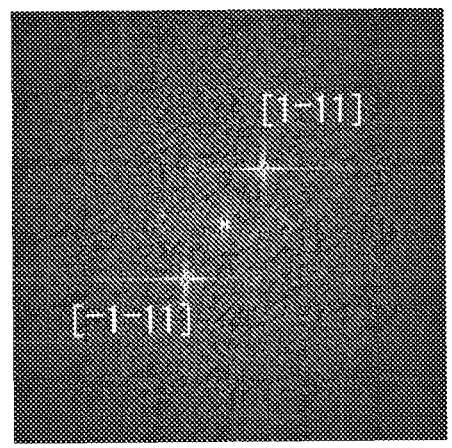
FIG. 7 is pseudo electron diffraction patterns of the alloy particles of platinum and nickel supported on the carbon powder supporting an alloy catalyst for redox reaction obtained by the production method of the present invention.
Figure 7:
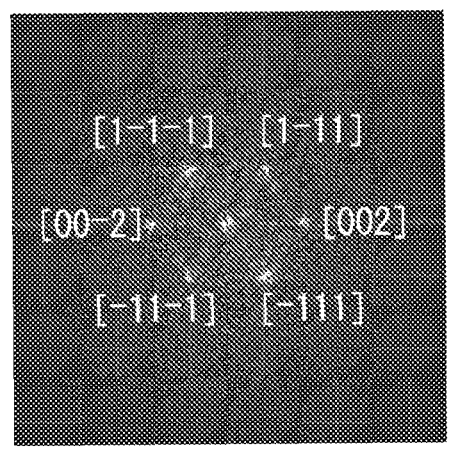
Figure 7:
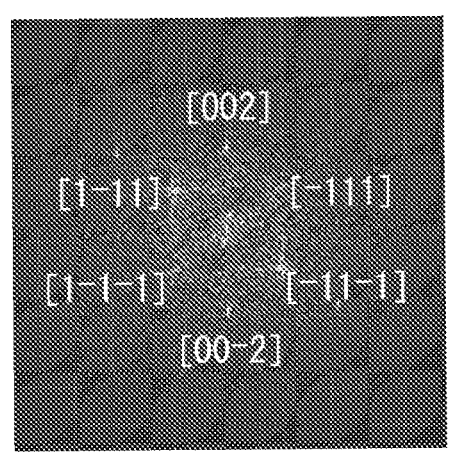

It is apparent from FIG. 7(a) that the alloy particle A of platinum and nickel has electron diffraction points at the positions of [1-11] and [−11-1]. Therefore, it is apparent that the Miller index of a surface $S_A$ in FIG. 6(a) is (1-11). Because the crystal lattice plane represented by the Miller index (1-11) is equivalent to the crystal lattice plane represented by the Miller index (111), it is apparent that the alloy particle A of platinum and nickel is equipped at the outer surface with the crystal lattice plane represented by the Miller index {111}.

Further, it is apparent from FIG. 7(b) that the alloy particle B of platinum and nickel has electron diffraction points at the positions of [1-11], [-11-1], [-111], [1-1-1], [002], and [00-2]. Therefore, it is apparent that, in FIG. 6(b), the Miller index of a surface $S_{B1}$ is (1-11), the Miller index of a surface $S_{B2}$ is (-111), and the Miller index of a surface $S_{B3}$ is (002). Because the crystal lattice plane represented by the Miller index (1-11) and the crystal lattice plane represented by the Miller index (-111) are equivalent to the crystal lattice plane represented by the Miller index (111), it is apparent that the alloy particle B of platinum and nickel is equipped at the outer surface with the crystal lattice plane represented by the Miller index {111}.

Still further, it is apparent from FIG. 7(c) that the alloy particle C of platinum and nickel has electron diffraction points at the positions of [1-11], [-11-1], [-111], [1-1-1], [002], and [00-2]. Therefore, it is apparent that, in FIG. 6(c), the Miller index of a surface $S_{C1}$ is (1-11), the Miller index of a surface $S_{C2}$ is (-111), and the Miller index of a surface $S_{C3}$ is (002). Because the crystal lattice plane represented by the Miller index (1-11) and the crystal lattice plane represented by the Miller index (-111) are equivalent to the crystal lattice plane represented by the Miller index (111), it is apparent that the alloy particle B of platinum and nickel is equipped at the outer surface with the crystal lattice plane represented by the Miller index {111}.

Figure 8:
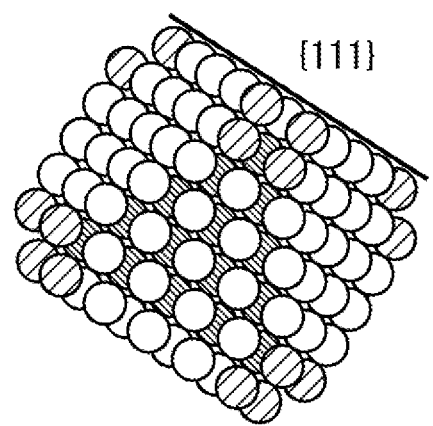
FIG. 8 is typical diagrams showing the alloy particles of platinum and nickel having a truncated regular octahedron shape.
Figure 8:
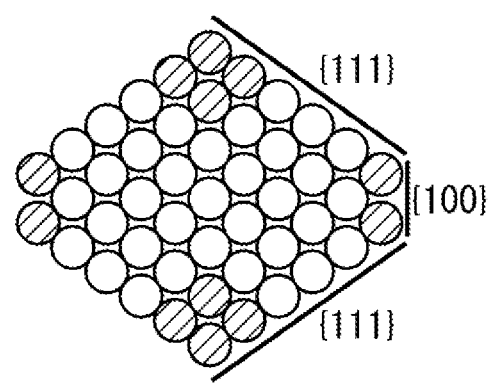

Next, FIG. 8(a) shows the alloy particle of platinum and nickel having the truncated regular octahedron shape shown in FIG. 1(a) rotated and seen from a predetermined angle α. The alloy particle shown in FIG. 8(a) is of an octagonal shape with four corners of a rectangle cut off, and is equipped at the outer surface with the crystal lattice plane represented by the Miller index {111}, and conforms to the result of the high resolution TEM image of the alloy particle A of platinum and nickel shown in FIG. 6(a). Therefore, it is apparent that the alloy particle A of platinum and nickel takes the truncated regular octahedron shape and is equipped at the outer surface with the crystal lattice plane represented by the Miller index {111}.

FIG. 8(b) shows the alloy particle of platinum and nickel having the truncated regular octahedron shape shown in FIG. 1(a) rotated and seen from a predetermined angle β. The alloy particle shown in FIG. 8(b) is of a hexagonal shape with two corners of a rhombus cut off, and is equipped at the outer surface with the crystal lattice plane represented by the Miller index {111}, and conforms to the result of the high resolution TEM image of the alloy particle B shown in FIG. 6(b). Therefore, it is apparent that the alloy particle B of platinum and nickel takes the truncated regular octahedron shape and is equipped at the outer surface with the crystal lattice plane represented by the Miller index {111}.

Figure 9:
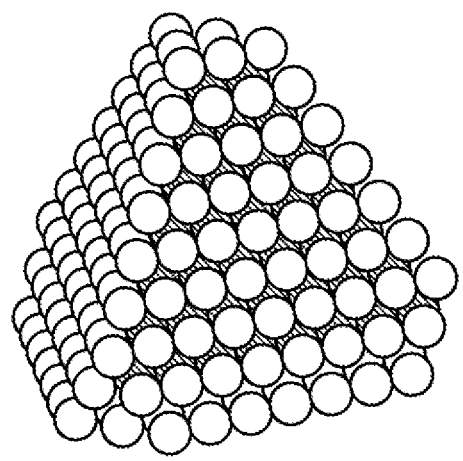
FIG. 9 is typical diagrams showing the alloy particles of platinum and nickel having a truncated regular tetrahedron shape.
Figure 9:
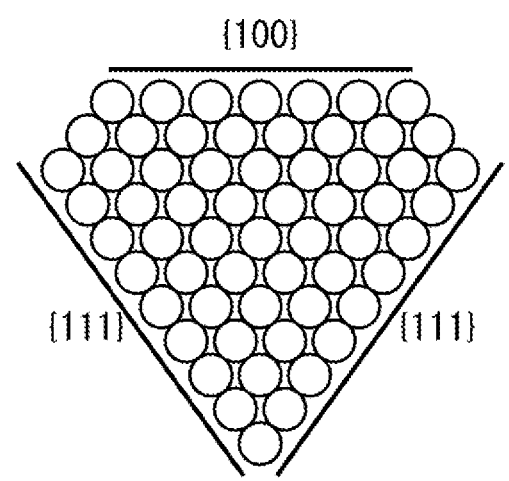

Next, FIG. 9(a) shows a typical diagram of the alloy particle of platinum and nickel having the truncated regular tetrahedron shape. In FIG. 9(a), white balls without hatched lines indicate, of the atoms constituting the truncated regular tetrahedron, the atoms exposed to the outer surface and forming the crystal lattice plane represented by the Miller index {111}. Further, in FIG. 9(a), balls with hatched lines indicate the atoms not exposed to the outer surface.

FIG. 9(b) shows the alloy particle having the truncated regular tetrahedron shape shown in FIG. 9(a) rotated and seen from a predetermined angle γ. The alloy particle shown in FIG. 9(b) is of a hexagonal shape with three corners of a triangle cut off, and is equipped at the outer surface with the crystal lattice plane represented by the Miller index {111}, and conforms to the result of the high resolution TEM image of the alloy particle C of platinum and nickel shown in FIG. 6(c). Therefore, it is apparent that the alloy particle C of platinum and nickel takes the truncated regular tetrahedron shape and is equipped at the outer surface with the crystal lattice plane represented by the Miller index {111}.

Therefore, it is apparent that the a carbon powder supporting an alloy catalyst for redox reaction obtained by the first aspect of the production method of the present embodiment is equipped at the outer surface with the crystal lattice plane represented by the Miller index {111} and supports alloy particles of platinum and nickel having an average particle diameter in the range of 6 to 20 nm.

Next, the second aspect of the production method of the carbon powder supporting an alloy catalyst for redox reaction in the present working embodiment will be described.

First, 24 mg of platinum acetylacetonate, 15 mg of nickel acetate tetrahydrate, 26 μL of 35% by mass aqueous solution of polydiallyldimethylammonium chloride (corresponding to 360 mg relative to 1 mol of platinum acetylacetonate), 50 mL of ethylene glycol, and 144 mg of carbon black powder are added to a three neck flask and mixed. As a result, a dispersed solution containing platinum acetylacetonate, nickel acetate tetrahydrate, and polydiallyldimethylammonium chloride dissolved in ethylene glycol and containing carbon black powder dispersed into ethylene glycol is obtained.

Next, the dispersed solution is heated to reflux at a temperature of 140° C. for two hours under a flowing argon, and then is cooled to room temperature in air. As a result, a black dispersed solution containing an alloy catalyst for redox reaction comprising alloy particles of platinum and nickel attached on the carbon black powder can be obtained.

Next, the black dispersed solution is performed with a suction filtration using a filter paper (manufactured by Kiriyama Glass Company, trade name: Kiriyama funnel filter paper No. 6). The filter paper has a pore diameter of 3 μm or less. Next, residues remaining on the filter paper are washed with 200 mL of a boiling ethanol and 200 mL of acetone, and unreacted materials are removed.

Next, residues remaining on the filter paper are taken out, and are heat treated at a temperature of 300° C. for two hours under a mixed gas atmosphere, the mixed gas being a mixture of hydrogen and argon at a volume ratio of 4:96. As a result, the carbon powder supporting the alloy catalyst for redox reaction can be obtained.

Next, the carbon powder supporting the alloy catalyst for redox reaction obtained by the second aspect of the production method in the present embodiment were subjected to exactly the same analysis as in the carbon powder supporting the alloy catalyst for redox reaction obtained by the first aspect. As a result, the carbon powder supporting the alloy catalyst for redox reaction obtained by the second aspect of the production method in the present embodiment was able to exhibit results similar to those of the carbon powder supporting the alloy catalyst for redox reaction obtained by the first aspect.

Therefore, it is apparent that the a carbon powder supporting an alloy catalyst for redox reaction obtained by the second aspect of the production method of the present embodiment is equipped at the outer surface with the crystal lattice plane represented by the Miller index {111} and supports alloy particles of platinum and nickel having an average particle diameter in the range of 6 to 20 nm.

What is claimed is:

1. A method for producing an alloy catalyst for redox reaction comprising alloy particles of platinum and nickel, wherein the alloy particles are equipped at an outer surface with a crystal lattice plane represented by a Miller index {111} and have an average particle diameter in a range of 6 to 20 nm, the method comprising:
dissolving, in an alcohol, a salt and/or complex of platinum, a salt and/or complex of nickel, and a polymer containing a plurality of salt structures comprising an organic cation and a halogen anion in a polymer chain and heating the resulting solution to reflux under an inert atmosphere.

2. The method for producing an alloy catalyst for redox reaction according to claim 1, wherein the alloy particles of platinum and nickel have any shape selected from the group consisting of a regular octahedron, a truncated regular octahedron, a regular tetrahedron, and a truncated regular tetrahedron.

3. The method for producing an alloy catalyst for redox reaction according to claim 1, wherein the salt and/or complex of platinum comprises at least one salt and/or complex selected from the group consisting of platinum acetylacetonate, platinum acetate, and a platinum ethylenediamine complex.

4. The method for producing an alloy catalyst for redox reaction according to claim 1, wherein the salt and/or complex of nickel comprises at least one salt and/or complex selected from the group consisting of nickel acetate tetrahydrate, nickel nitrate, and a nickel acetylacetonate complex.

5. The method for producing an alloy catalyst for redox reaction according to claim 1, wherein the polymer containing a plurality of salt structures comprising an organic cation and a halogen anion in a polymer chain comprises polydiallyldimethylammonium chloride.

6. The method for producing an alloy catalyst for redox reaction according to claim 1, wherein the alcohol comprises at least one alcohol selected from the group consisting of ethylene glycol, glycerine, and propylene glycol.

7. The method for producing an alloy catalyst for redox reaction according to claim 1, wherein the salt and/or complex of platinum and the salt and/or complex of nickel are used in a molar ratio in a range of 1:1 to 1:3.

8. The method for producing an alloy catalyst for redox reaction according to claim 1, wherein a concentration of the salt and/or complex of platinum relative to the alcohol is in a range of 0.5 to 30 mmol/liter.

9. The method for producing an alloy catalyst for redox reaction according to claim 1, wherein the inert atmosphere comprises an argon atmosphere.

10. The method for producing an alloy catalyst for redox reaction according to claim 9, wherein the heating to reflux is conducted under the argon atmosphere, at a temperature in a range of 130 to 190° C., and for a period of time in a range of 1 to 3 hours.

11. A method for producing a carbon powder supporting an alloy catalyst for redox reaction comprising alloy particles of platinum and nickel, wherein the alloy particles are equipped at an outer surface with a crystal lattice plane represented by a Miller index {111} and have an average particle diameter in a range of 6 to 20 nm, and the alloy catalyst for redox reaction is supported on the carbon powder, the method comprising the steps of:
dissolving, in an alcohol, a salt and/or complex of platinum, a salt and/or complex of nickel, and a polymer containing a plurality of salt structures comprising an organic cation and a halogen anion in a polymer chain and heating the resulting solution to reflux under an inert atmosphere;
attaching the alloy particles of platinum and nickel, which are a reaction product of the heating to reflux, onto the carbon powder; and
heat treating the carbon powder having the alloy particles of platinum and nickel attached under a nonoxidative atmosphere.

12. The method for producing the carbon powder supporting an alloy catalyst for redox reaction according to claim 11, wherein the alloy particles of platinum and nickel have any shape selected from the group consisting of a regular octahedron, a truncated regular octahedron, a regular tetrahedron, and a truncated regular tetrahedron.

13. The method for producing the carbon powder supporting an alloy catalyst for redox reaction according to claim 11, wherein the salt and/or complex of platinum comprises at least one salt and/or complex selected from the group consisting of platinum acetylacetonate, platinum acetate, and a platinum ethylenediamine complex.

14. The method for producing the carbon powder supporting an alloy catalyst for redox reaction according to claim 11, wherein the salt and/or complex of nickel comprises at least one salt and/or complex selected from the group consisting of nickel acetate tetrahydrate, nickel nitrate, and a nickel acetylacetonate complex.

15. The method for producing the carbon powder supporting an alloy catalyst for redox reaction according to claim 11, wherein the polymer containing a plurality of salt structures comprising an organic cation and a halogen anion in a polymer chain comprises polydiallyldimethylammonium chloride.

16. The method for producing the carbon powder supporting an alloy catalyst for redox reaction according to claim 11, wherein the alcohol comprises at least one alcohol selected from the group consisting of ethylene glycol, glycerine, and propylene glycol.

17. The method for producing the carbon powder supporting an alloy catalyst for redox reaction according to claim 11, wherein the salt and/or complex of platinum and the salt and/or complex of nickel are used in a molar ratio in a range of 1:1 to 1:3.

18. The method for producing the carbon powder supporting an alloy catalyst for redox reaction according to claim 11, wherein a concentration of the salt and/or complex of platinum relative to the alcohol is in a range of 0.5 to 30 mmol/liter.

19. The method for producing the carbon powder supporting an alloy catalyst for redox reaction according to claim 11, wherein the inert atmosphere comprises an argon atmosphere.

20. The method for producing the carbon powder supporting an alloy catalyst for redox reaction according to claim 19, wherein the heating to reflux is conducted under the argon atmosphere, at a temperature in a range of 130 to 190° C., and for a period of time in a range of 1 to 3 hours.

21. The method for producing the carbon powder supporting an alloy catalyst for redox reaction according to claim 11, wherein the carbon powder comprises a carbon black powder and/or carbon nanotube.

22. The method for producing the carbon powder supporting an alloy catalyst for redox reaction according to claim 11, wherein the carbon powder and the alloy particles of platinum and nickel are used in a mass ratio in a range of 1:9 to 1:1.

23. The method for producing the carbon powder supporting an alloy catalyst for redox reaction according to claim 11, wherein the step of attaching the alloy particles of platinum and nickel, which are a reaction product of the heating to reflux, onto the carbon powder is conducted by dispersing the alloy particles of platinum and nickel and the carbon powder into a solvent and stirring the same.

24. The method for producing the carbon powder supporting an alloy catalyst for redox reaction according to claim 23, wherein the solvent comprises methanol or ethanol.

25. The method for producing the carbon powder supporting an alloy catalyst for redox reaction according to claim 23, wherein a concentration of the alloy particles of platinum and nickel relative to the solvent is in a range of 0.3 to 12 g/liter.

26. The method for producing the carbon powder supporting an alloy catalyst for redox reaction according to claim 11, wherein the heat treating under the nonoxidative atmosphere is conducted under a mixed atmosphere of hydrogen and argon.

27. The method for producing the carbon powder supporting an alloy catalyst for redox reaction according to claim 26, wherein the mixed atmosphere comprises an atmosphere containing 4 to 10% by volume of hydrogen in argon.

28. The method for producing the carbon powder supporting an alloy catalyst for redox reaction according to claim 26, wherein the heat treating under the nonoxidative atmosphere is conducted under the mixed atmosphere, at a temperature in a range of 200 to 400° C., and for a period of time in a range of 1 to 3 hours.

29. A method for producing a carbon powder supporting an alloy catalyst for redox reaction comprising alloy particles of platinum and nickel, wherein the alloy particles are equipped at an outer surface with a crystal lattice plane represented by a Miller index {111} and have an average particle diameter in a range of 6 to 20 nm, and the alloy catalyst for redox reaction is supported on the carbon powder, the method comprising the steps of:
  dissolving, in an alcohol, a salt and/or complex of platinum, a salt and/or complex of nickel, and a polymer containing a plurality of salt structures comprising an organic cation and a halogen anion in a polymer chain, dispersing a carbon powder into the resulting solution, and heating the resulting dispersed solution to reflux under an inert atmosphere; and
  heat treating a reaction product of the heating to reflux under a nonoxidative atmosphere.

30. The method for producing the carbon powder supporting an alloy catalyst for redox reaction according to claim 29, wherein the alloy particles of platinum and nickel have any shape selected from the group consisting of a regular octahedron, a truncated regular octahedron, a regular tetrahedron, and a truncated regular tetrahedron.

31. The method for producing the carbon powder supporting an alloy catalyst for redox reaction according to claim 29, wherein the salt and/or complex of platinum comprises at least one salt and/or complex selected from the group consisting of platinum acetylacetonate, platinum acetate, and a platinum ethylenediamine complex.

32. The method for producing the carbon powder supporting an alloy catalyst for redox reaction according to claim 29, wherein the salt and/or complex of nickel comprises at least one salt and/or complex selected from the group consisting of nickel acetate tetrahydrate, nickel nitrate, and a nickel acetylacetonate complex.

33. The method for producing the carbon powder supporting an alloy catalyst for redox reaction according to claim 29, wherein the polymer containing a plurality of salt structures comprising an organic cation and a halogen anion in a polymer chain comprises polydiallyldimethylammonium chloride.

34. The method for producing the carbon powder supporting an alloy catalyst for redox reaction according to claim 29, wherein the alcohol comprises at least one alcohol selected from the group consisting of ethylene glycol, glycerine, and propylene glycol.

35. The method for producing the carbon powder supporting an alloy catalyst for redox reaction according to claim 29, wherein the salt and/or complex of platinum and the salt and/or complex of nickel are used in a molar ratio in a range of 1:1 to 1:3.

36. The method for producing the carbon powder supporting an alloy catalyst for redox reaction according to claim 29, wherein a concentration of the salt and/or complex of platinum relative to the alcohol is in a range of 0.5 to 30 mmol/liter.

37. The method for producing the carbon powder supporting an alloy catalyst for redox reaction according to claim 29, wherein the inert atmosphere comprises an argon atmosphere.

38. The method for producing the carbon powder supporting an alloy catalyst for redox reaction according to claim 37, wherein the heating to reflux is conducted under the argon atmosphere, at a temperature in a range of 130 to 190° C., and for a period of time in a range of 1 to 3 hours.

39. The method for producing the carbon powder supporting an alloy catalyst for redox reaction according to claim 29, wherein the carbon powder comprises a carbon black powder and/or carbon nanotube.

40. The method for producing the carbon powder supporting an alloy catalyst for redox reaction according to claim 29, wherein the carbon powder and the alloy particles of platinum and nickel are used in a mass ratio in a range of 1:9 to 1:1.

41. The method for producing the carbon powder supporting an alloy catalyst for redox reaction according to claim 29, wherein the heat treating under the nonoxidative atmosphere is conducted under a mixed atmosphere of hydrogen and argon.

42. The method for producing the carbon powder supporting an alloy catalyst for redox reaction according to claim 41, wherein the mixed atmosphere comprises an atmosphere containing 4 to 10% by volume of hydrogen in argon.

43. The method for producing the carbon powder supporting an alloy catalyst for redox reaction according to claim 41, wherein the heat treating under the nonoxidative atmosphere is conducted under the mixed atmosphere, at a temperature in a range of 200 to 400° C., and for a period of time in a range of 1 to 3 hours.

* * * * *